Oct. 11, 1960  M. C. HEMSWORTH  2,955,744
COMPRESSOR
Filed May 20, 1955
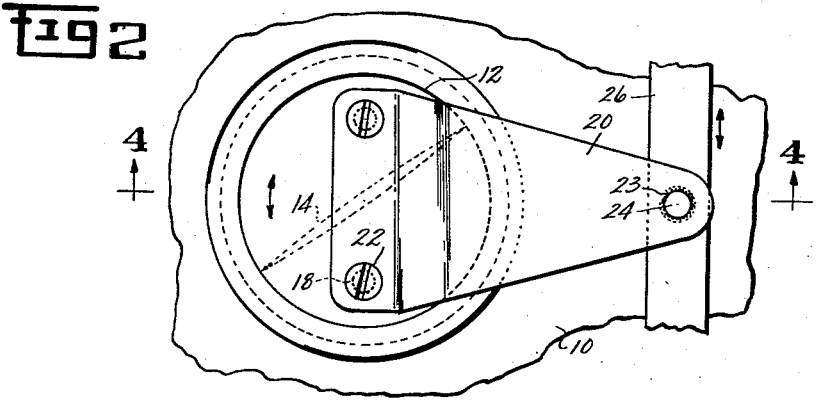
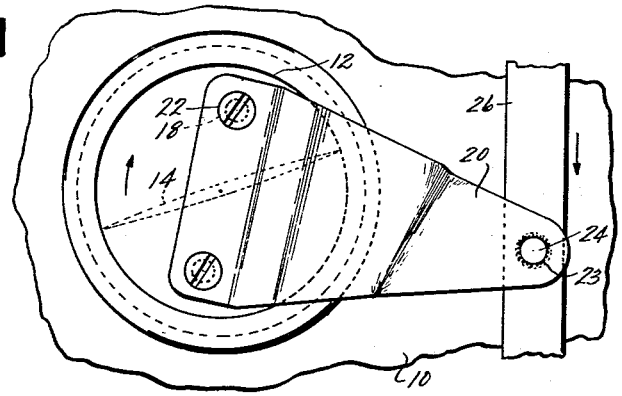
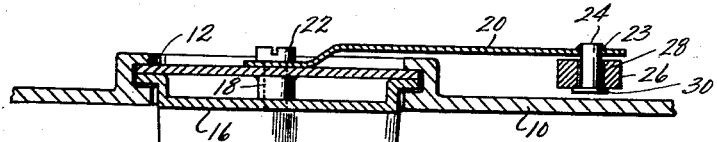
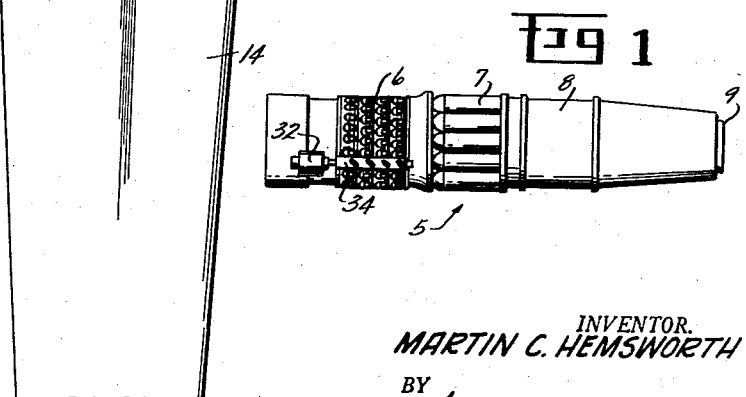
INVENTOR.
MARTIN C. HEMSWORTH
BY
Edward M. Tritle
HIS ATTORNEY

United States Patent Office 2,955,744
Patented Oct. 11, 1960

2,955,744
COMPRESSOR

Martin Carl Hemsworth, Cincinnati, Ohio, assignor to General Electric Company, a corporation of New York Filed May 20, 1955, Ser. No. 509,944

2 Claims. (Cl. 230—114)

This invention relates to a turbomachine and in particular to an axial flow compressor for a turbojet engine.

In normal turbojet engines motive fluid passes into a compressor and is compressed. From there it passes into combustion chambers where the combustion process takes place. The hot gases emanating from the combustion chamber pass downstream through a turbine. A portion of the energy is taken out of the turbine for driving the compressor. The remaining gases pass through the exhaust nozzle at sufficient velocities to produce forward thrust. In order to obtain more thrust from a turbojet engine, it is desirable to have a high pressure ratio compressor for the engine so that the cycle produces a higher velocity of exhaust gases. However, when a high pressure ratio compressor is used, stall characteristics occur during various stages of increasing speeds of the engine. In order to prevent the stall characteristics from occurring, it is desirable to incorporate stator vanes which are adapted to be varied, so as to provide the correct airfoil position for the particular velocity of flowing air. The operating characteristics of the compressor are thereby improved by this method under certain running conditions by properly changing the direction or quantity of air flow. It is therefore an object of this invention to provide a multiple positioning and scheduling device for changing the angle of attack of one or more stages, or rows, of stationary vanes in an axial flow compressor.

It is another object of this invention to provide a device for varying the stator vanes of a compressor of an aircraft gas turbine by a sensitive linkage arrangement in which the actuating bands are permitted to rotate in one plane and the lever arms for turning the stator vanes rotate in another plane.

In order to prevent the vibrations created in the compressor of a turbojet engine from damaging the parts that are connected together to make up the mechanisms for varying the stators, the connections must be made to close dimensions and be tight fitting. When making the parts tight fitting, various problems arise in making the device operative. For example, one of the difficulties encountered is in the pivotal connection between the levers and the band actuator. The openings in the band actuator always tend to be directed in a radial direction as the band rotates about the compressor. Each lever arm rotates in a plane which is normal to a radius of the compressor, therefore the opening in the free end of the lever arm is in a radial direction only at the point where its plane of rotation is tangent to that of the actuator band. As the lever arm rotates away from this point of tangency, the pin in the lever arm tends to deviate from its initial radial direction. Since the opening in the band remains in a radial direction, this causes the pin to twist from the lever arm or the lever arm to become distorted. In other words, the pins in the lever arms tend to remain in a direction perpendicular to the lever arms and parallel to a radius of the compressor while the holes in the band actuator tend to remain in a radial direction. This would normally cause binding as the lever arms and actuator bands rotate in their respective planes. It is therefore another object of this invention to provide a means for permitting the pins connecting the lever arm and actuator band to remain in a radial direction without affecting the operation of the parts connected thereto and still maintain a tight connection between the parts.

It is another object of this invention to provide a plurality of lever arms connected to an actuator band in such a manner that the lever arms twist so as to account for the difference of turning in different planes between the lever arm and the actuator band.

These and other objects will become more apparent when read in the light of the accompanying drawings and specification wherein like parts have like numbers and wherein the parts are intended to be as generic in their application as the prior art will permit, and wherein:

Figure 1 is a side elevation view of a turbojet engine;

Figure 2 is a plan view of a portion of a compressor casing showing a stator vane with a torsionally flexible lever arm connected to an actuator band;

Figure 3 is a plan view showing a stator vane in a different position after it has been rotated showing the lever arm twisting so as to permit the lever arm and the actuator bands to turn in different planes;

Figure 4 is a cross-sectional view on lines 4—4 of Figure 1 showing the stator vane, flexible lever arm and actuator band.

Therefore, according to one aspect of my invention, a mechanism is provided for actuating the stages of stator vanes of a compressor in a turbojet engine. This mechanism includes a torsionally flexible lever arm connected to the stator vanes and to an annular actuator band. The flexible lever arm twists, thus permitting the actuator band to turn circumferentially and the lever arm to pivot tangentially thereto without the parts becoming separated or damaged due to binding. The lever arm can be made of any thin, strong, relatively light material (preferably metallic) which is torsionally flexible.

Referring to Figure 1, the numeral 5 generally designates a turbojet engine having a compressor section 6, combustion section 7, turbine area 8 and exhaust nozzle 9. Referring to Figures 2–4, the numeral 10 generally designates the compressor casing. The compressor casing is provided with a plurality of radial openings, one of which is shown at 12, machined with a flat bearing surface. The number of openings corresponds to the number of variable stator vanes. Mounted in each of the openings 12 is a stator vane 14 which is connected at its base to a circular support member 16 in any well-known manner, such as brazing, welding, etc., or it may be forged as a single unit.

The base support member 16 is cylindrical in shape and is provided with a plurality of studs 18 or the like extending outward from the base member 16 in a direction opposite to the vane 14. The studs 18 are positioned in a predetermined relationship with respect to the airfoil of the vane so as to give the proper angle of attack to the stator vanes. Connected to the studs 18 is a vane or lever arm 20 secured thereto by nuts or the like 22. In this manner the openings in the lever arm 20 and studs 18 in the base member 16 fix the position of the vane lever arm with respect to the vane. This manner of securing the vane lever arm 20 to the base portion 16 of the variable stator vane is done so that the vane lever arm and the stator vane move in unison. It is noted that the vane lever arm 20 is torsionally flexible so that it can twist, but is yet sufficiently rigid to support and maintain an actuator band concentric to the compressor casing. The opening 23 in the free end of the lever arm 20 is provided with a pin 24 secured thereto by welding or brazing or the like. The pin 24 is illustrated as extending in a normal direction with respect to the lever arm. An actuator band 26 extends circumferentially about the compressor casing and is coaxial therewith. The actuator band 26 is provided with a plurality of openings 28, the axis of each opening lying on a radius of the casing and there being one opening for each stator vane. The pins 24 extend through the opening 28 in the actuator band. It is noted that the pins 24 have heads 30 so as to hold the actuator bands in place. Any type of motor 32 and torque tube means 34 may be provided to rotate the actuator bands 26 and the stator vanes. This can be in the form of any type of actuating means which is responsive to parameters such as temperature and pressure in the compressor, turbine or exhaust nozzle, so as to provide a signal to the actuating means.

In operation, the actuator band is rotated circumferentially about the compressor casing 12 in response to one of the various parameters mentioned above. For example, the temperatures and pressures encountered at a particular flight condition might tend to stall the compressor. These parameters are sensed to provide a signal for energizing the actuating means to rotate the actuator band a predetermined amount in accordance with the signal. As the band 26 is rotated circumferentially, the pin 24 is displaced from its original position and the lever arm 20 is rotated in a plane substantially tangent to the circumference of the band. Allowance must therefore be made for the movement in different planes of the pin 24 and opening 28. This is accomplished by the lever arm 20 being sufficiently flexible to permit the twisting thereof. The pin 24 can thus remain in a radial direction without damage to the lever arm or actuator band. As the lever arm rotates, the stator vane 14 rotates since it is fixedly secured to the lever arm 20. In this manner the stator vanes 14 are rotated to a position in such a manner as to provide the correct angle of attack of the vanes at the desired speed.

Since the openings 28 in the actuator band 26 tend to remain in the radial direction and since the pin 24 tends to move out of the radial direction, binding and the twisting of the parts would normally result. However, since the vane lever arm 20 is torsionally flexible, the pin 24 can remain in the radial direction with the opening 26 while the vane lever arm 20 twists.

The construction illustrated permits the lever arm and actuator band to rotate in different planes without interference or binding which would result in damage to the engine. The arrangement provides a cheap and efficient means for permitting the rotation of the stator vanes.

The specific embodiment described above has been given by way of illustration and not by way of limitation. Many improvements, modifications and changes may be made to the above device without departing from the spirit and scope of the invention. All of these modifications and changes are intended to be included within the scope of this invention.

What I claim as new and desire to secure by Letters Patent of the United States is:

1. In a variable stator compressor which includes a cylindrical casing and at least one stage of variable stator vanes mounted in the casing and positioned radially thereof, means for varying said vanes comprising: an actuating band encircling the casing and adapted to rotate thereabout, said band having a plurality of openings spaced about its circumference, the axis of each opening lying on a radius of the casing; a pin received within each opening; and a lever arm secured to each vane with a free end projecting normally therefrom toward the band, the free end of each lever arm being fixed to a pin, each lever arm being adapted to rotate in a plane normal to its attached vane, each of the lever arms having a relatively thin, flat configuration in cross section as compared to said actuating band to enable said arms to be torsionally flexible to permit rotational movement of the lever arm and band in different planes without interference or binding.

2. For use in a variable stator compressor which includes a cylindrical casing and at least one stage of variable stator vanes mounted in the casing and positioned radially thereof, means for varying said vanes comprising: an annular actuating band adapted to encircle the casing for rotation thereabout, said band having a plurality of openings spaced about its circumference, the axis of each opening lying on a radius of the band; a pin received within each opening; and a lever arm adapted to be secured to each vane with a free end projecting normally therefrom toward the band, the free end of each lever arm being fixed to a pin, each lever arm being adapted to rotate in a plane tangent to the actuating band, each of said lever arms having a cross sectional area relative to the cross sectional area of said band such that the arms will be sufficiently tangentially rigid with respect to the band to support said band yet sufficiently torsionally flexible to permit rotational movement of the lever arm and band in different planes without interference or binding.

References Cited in the file of this patent

UNITED STATES PATENTS

| | | |
|---|---|---|
| 1,394,784 | Pearson | Oct. 25, 1921 |
| 1,451,694 | Haeberlein | Apr. 17, 1923 |
| 1,543,050 | Benson | June 23, 1925 |
| 1,585,862 | Jessop | May 25, 1926 |
| 1,782,498 | Biggs | Nov. 25, 1930 |
| 2,065,974 | Marguerre | Dec. 29, 1936 |
| 2,232,847 | Geyer | Feb. 25, 1941 |
| 2,371,706 | Planiol | Mar. 20, 1945 |
| 2,435,091 | Meyer | Jan. 27, 1948 |
| 2,435,092 | Meyer | Jan. 27, 1948 |
| 2,441,427 | Lincoln | May 11, 1948 |
| 2,651,496 | Buckland et al. | Sept. 8, 1953 |

FOREIGN PATENTS

| | | |
|---|---|---|
| 247,831 | Switzerland | Jan. 3, 1948 |
| 602,060 | France | Dec. 16, 1925 |